(12) United States Patent
Drabant et al.

(10) Patent No.: US 7,287,770 B2
(45) Date of Patent: Oct. 30, 2007

(54) RUNNING BOARD, MOTOR VEHICLE INCLUDING A RUNNING BOARD, AND A METHOD FOR INSTALLING A RUNNING BOARD TO A MOTOR VEHICLE

(75) Inventors: Steve Drabant, Snellville, GA (US); Shawn Kozak, Decatur, GA (US)

(73) Assignee: Lund International, Inc., Anoka, MN (US)

( * ) Notice: Subject to any disclaimer, the term of this patent is extended or adjusted under 35 U.S.C. 154(b) by 51 days.

(21) Appl. No.: 10/866,516

(22) Filed: Jun. 12, 2004

(65) Prior Publication Data

US 2005/0275186 A1 Dec. 15, 2005

(51) Int. Cl.
*B60R 3/00* (2006.01)

(52) U.S. Cl. ................... 280/163; 280/169

(58) Field of Classification Search ........... 280/163, 280/164.1, 164.2, 166, 169, 291; D12/114, D12/107, 110, 120
See application file for complete search history.

(56) References Cited

U.S. PATENT DOCUMENTS

| | | | |
|---|---|---|---|
| 1,789,875 A | 1/1931 | Loudenslager | |
| 1,861,430 A | 5/1932 | Bronson | |
| 1,998,366 A | 4/1935 | Geyer | |
| 2,021,522 A | 11/1935 | Schacht | |
| 2,064,134 A | 2/1936 | Weiland | |
| 2,044,407 A | 6/1936 | Smith | |
| 2,122,240 A | 6/1938 | Smith | |
| 2,132,471 A | 10/1938 | Hoffman | |
| 3,488,082 A | 1/1970 | Wallace | |
| 4,544,991 A | 10/1985 | Gorsuch | |
| 4,557,494 A | 12/1985 | Elwell | |
| 4,749,191 A | 6/1988 | Gipson et al. | |
| 4,935,638 A | 6/1990 | Straka | |
| 4,985,810 A | 1/1991 | Ramsey | |
| D330,536 S | 10/1992 | Holloway et al. | |
| 5,265,896 A | 11/1993 | Kravitz | |
| 5,382,035 A | 1/1995 | Waddington et al. | |
| 5,501,475 A * | 3/1996 | Bundy | 280/166 |
| 5,713,589 A | 2/1998 | Delgado et al. | |
| 5,738,180 A | 4/1998 | Hofmann et al. | |
| 5,769,439 A * | 6/1998 | Thompson | 280/163 |
| 5,961,138 A * | 10/1999 | Roark et al. | 280/291 |
| 6,161,859 A * | 12/2000 | Cheng | 280/291 |
| 6,173,979 B1 | 1/2001 | Bernard | |
| 6,533,302 B2 * | 3/2003 | Scruggs et al. | 280/163 |
| 6,581,946 B2 * | 6/2003 | Lund et al. | 280/163 |
| 6,588,782 B2 * | 7/2003 | Coomber et al. | 280/163 |
| 6,910,700 B2 * | 6/2005 | Kayne | 280/164.2 |

OTHER PUBLICATIONS

"Lund SuperStep Installation Instructions", 4 Pages, © Oct. 1994, Author Unknown.
Delta III "Running Board", Brochure, 1 Page, Date and Author Unknown.

* cited by examiner

*Primary Examiner*—Christopher P. Ellis
*Assistant Examiner*—Brian Swenson
(74) *Attorney, Agent, or Firm*—Merchant & Gould, P.A.

(57) ABSTRACT

A running board is provided by the invention. The running board includes a deck, a stepping surface material, and a step cover. The stepping surface material includes raised portions that prevent foot slippage. The cover portion partially overlaps the stepping material to secure it in a place on the deck. A motor vehicle with a running board and methods for installing the running board are also provided.

25 Claims, 4 Drawing Sheets

US 7,287,770 B2

RUNNING BOARD, MOTOR VEHICLE INCLUDING A RUNNING BOARD, AND A METHOD FOR INSTALLING A RUNNING BOARD TO A MOTOR VEHICLE

FIELD OF THE INVENTION

The invention relates to a running board for a motor vehicle, a motor vehicle including a running board, and a method for installing a running board to a motor vehicle.

BACKGROUND OF THE INVENTION

Many types of vehicles, including sports utility vehicles, pick up trucks, and vans, are raised off the ground farther than normal passenger automobiles. The increased height of the floor of the passenger cab from the ground makes it difficult to enter and exit these vehicles. In addition, if the vehicles are driven over rough terrain, their lower body panels and door panels are susceptible to being scratched, dented, or otherwise damaged by rocks or other ground debris. Accordingly, running boards provide a stepping surface to assist the driver and passengers in entering and exiting these vehicles. In addition, the running boards protect the body of the vehicles from being damaged from below.

Running boards commonly include a least two different materials that are attached together, namely, a first material for the body of the running board and a second material for the stepping surface of the running board. There exist numerous references describing various running board designs. For example, see U.S. Pat. No. 6,173,979 to Bernard; U.S. Pat. No. 5,713,589 to Delgado et al.; U.S. Pat. No. 1,861,430 to Bronson; 300,536 to Holloway et al.; U.S. Pat. No. 4,935,638 to Straka; U.S. Pat. No. 2,122,240 to Smith; and U.S. Pat. No. 2,021,522 to Schacht.

SUMMARY OF THE INVENTION

A running board is provided according to the invention. The running board includes a deck, a mat, and a step cover. The deck includes a step portion and a support structure for supporting the step portion. The mat provides a stepping surface and is positioned on the step portion of the deck with a portion thereof sandwiched between the deck and the step cover. The step cover is attached to the deck to aid in securing the mat in position.

A motor vehicle is provided according to the invention. The motor vehicle includes a running board positioned along the side of the vehicle behind the front wheels of the outer doors. The motor vehicle can include a pair of opposed running boards, one provided beneath the driver's side door and one provided beneath the passenger's side door. Each running board can include a deck, a step cover, and a mat, wherein a portion of the mat is sandwiched between the deck and the step cover.

A method for installing a running board is provided according to the invention. The method includes the steps of attaching a mat to a running board by placing a step cover over a portion of the mat and affixing the step cover to the running board, and attaching the running board to the vehicle.

DETAILED DESCRIPTION OF THE PREFERRED EMBODIMENT

Figure 1:
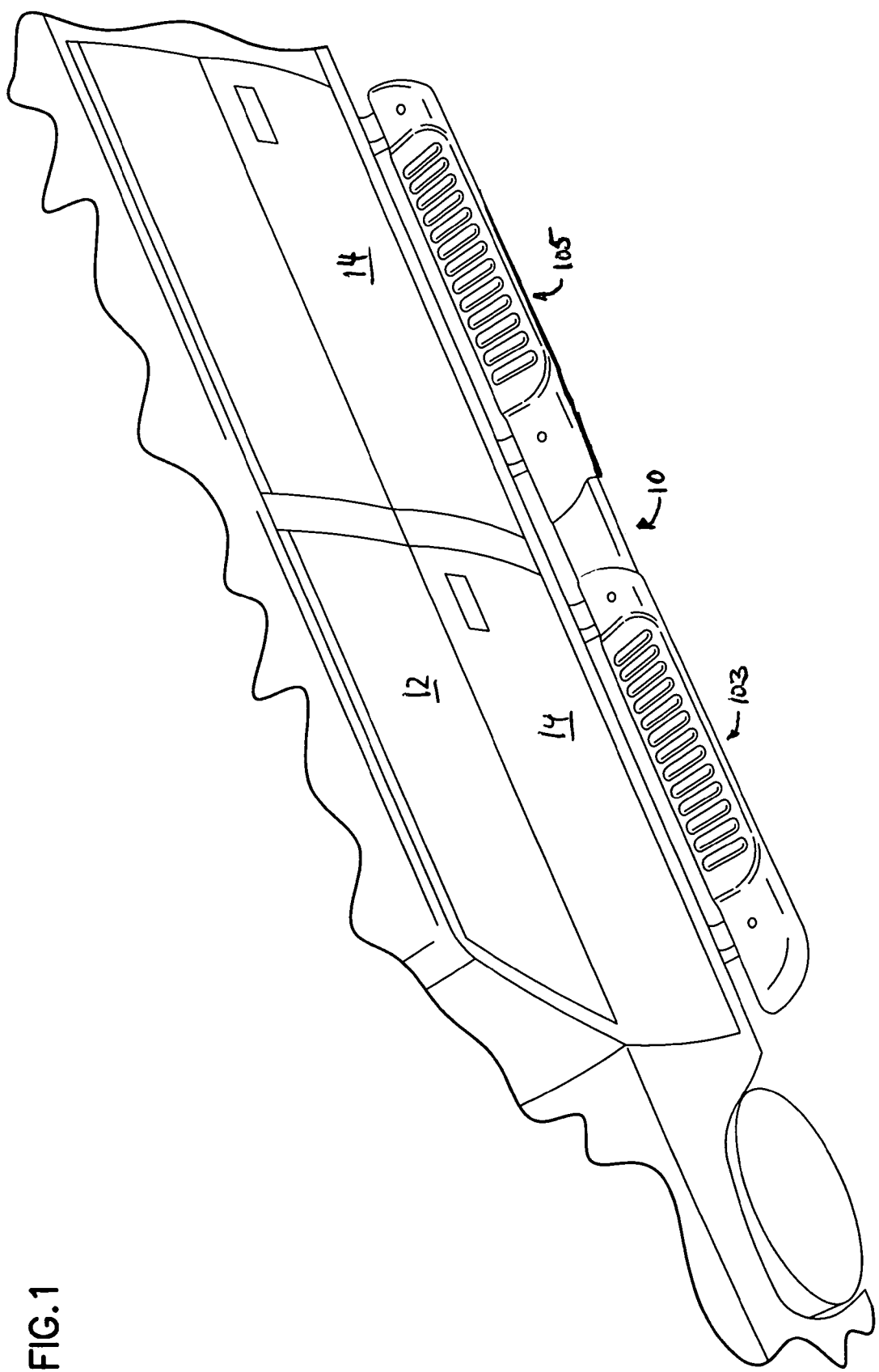
FIG. 1 is a perspective view of a running board according to the principles of the present invention attached to a motor vehicle.

Referring to FIG. 1, a running board according to the invention is shown at reference numeral 10. The running board 10 is shown attached to a motor vehicle 12. The running board 10 is provided beneath the vehicle doors 14 so that it functions as a step for someone entering or exiting the vehicle 12. The running board 10 can be provided on any type of motor vehicle where a step is desired to assist entering or exiting the vehicle 12. Some of the various types of vehicles 12 that can be provided with running boards include pickup trucks, sports utility vehicles, vans, hauling trucks, and many others. The running board 10 according to the invention can be provided beneath a single door or it can be provided so that it extends from the front doors to the rear doors of a motor vehicle 12.

Figure 2:
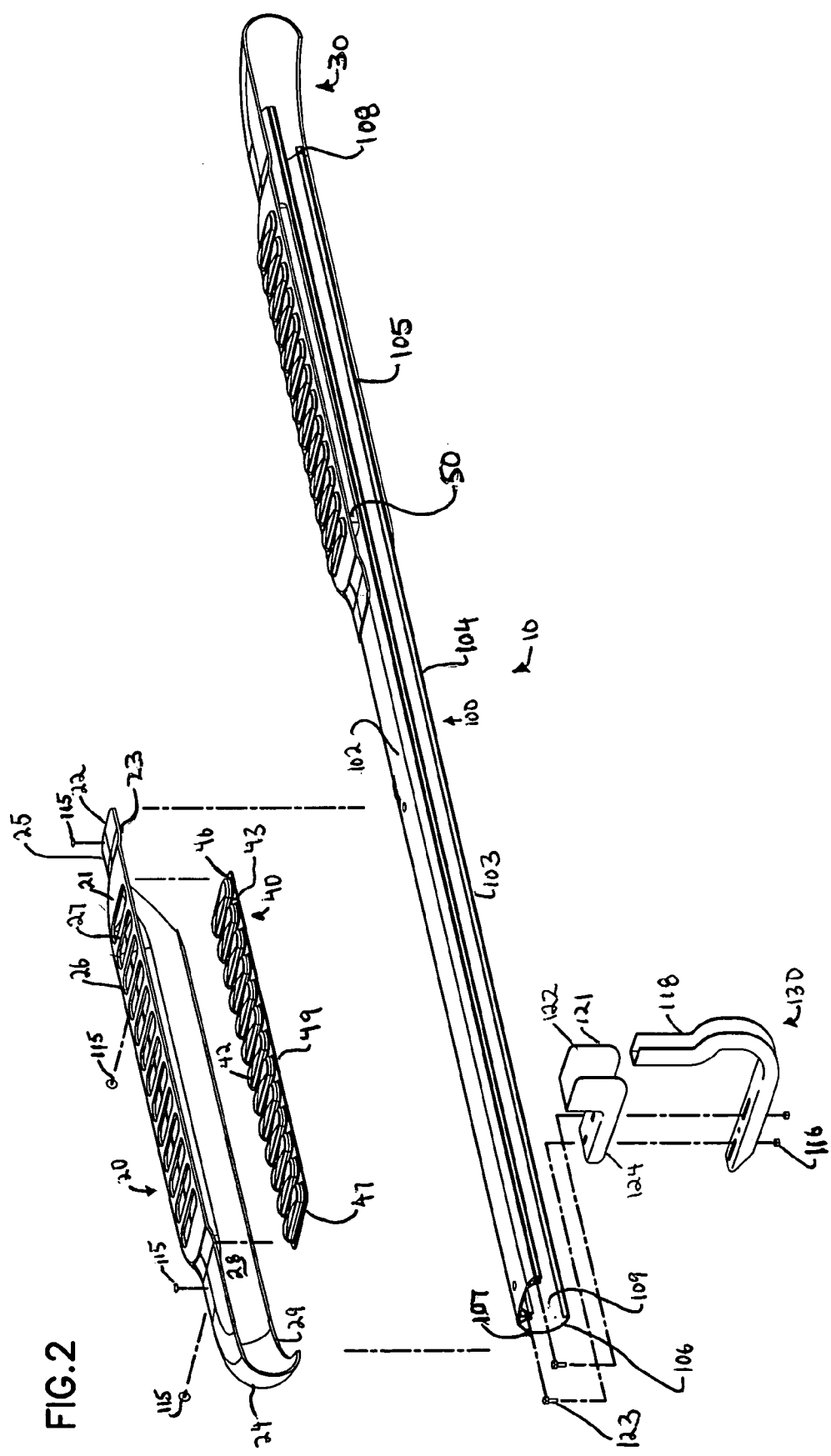
FIG. 2 is a perspective view of the running board of FIG. 1, partially exploded.

Referring to FIG. 2, a running board 10 according to the invention is shown. The running board 10 includes a deck 100 having a top side 102, a bottom side 104, a front side 107, a back side 109, a first end 106, a second end 108, a first step portion 103, and a second step portion 105.

As shown, the deck 100 can include a flat surface portion on the top portion 102 of the deck 100. As shown, the bottom portion 104 and the top portion 102 connect at the front surface 107, but do not connect at the back side 109. The first end 106 and the second end 108 of the deck 100 are not "finished off" or enclosed. In other words, the deck 100 terminates in ends 106, 108 that have exposed cross-sectional profiles. The deck 100 further includes two step portions 103 and 105. The step portions, also referred to as step members or step zones, 103, 105 are located below the doors 14 of the vehicle 12 and are sized to support the weight of a person to aid the entry and exit of the person from the vehicle 12. The deck 100 can be fabricated from aluminum; however, it should be appreciated that the deck 100 could be fabricated from steel, plastic, or any number of other materials or combinations thereof. It should further be appreciated that the deck 100 need not include the above-described structure so long as it is configured to support a person's foot while the person enters and exits a vehicle.

In particular, it should also be appreciated that in alternative embodiments the top surface 102 of the deck 100 need not be flat. For example, the top portion 102 could be rounded or have any other surface profile. In addition, the top portion 102 and the bottom portion 104 could be continuous, as they would be in a square or cylindrical tube shaped deck. In addition, the ends 106, 108 rather than left open, could be finished off. Also, the deck 100 could include more or less step portions 103, 105 depending on, for example, the number of doors 14 on one side of the motor vehicle 12. Moreover, it should be appreciated that the surface of the deck 100 can be painted, coated, or otherwise finished as desired.

Still referring to FIG. 2, mats 40, 50 and step covers 20, 30 are shown relative to the deck 100. The first mat 20 is positioned over the first step portion 103 and the second mat 50 is positioned over the second step portion 105. The first step cover 20 is position over a portion of the first mat 40 and attached to the deck 100. Similarly, the second step cover 30 is position over a portion of the second mat 50 and attached to the deck 100. As shown, the first step cover 20 encloses, or finishes off, the first end 106 of the deck 100 and the second step cover 30 encloses, or finishes off, the second end 108 of the deck 100.

Still referring to FIG. 2, the step covers 20 and 30 are shown. The step cover 30 is not referenced separately in detail since it is a mirror reflection of step cover 20. Step cover 20 can include a top surface 21, a bottom surface 23, a first end 24, and a second end 22. The top surface 21 can include a plurality of elongated cutouts 26 separated by extensions 27 that are arranged perpendicular to the longitudinal axis of the step cover 20. In the embodiment shown, the step cover 20 includes thirteen cutouts 26. It should be appreciated that the step cover 20 could include any number of cutouts 26 each being any shape or size and arranged on step cover 20 in a variety of different patterns. The step cover 20 can be attached to the deck 100 by a number of fasteners 115. The fasteners 115 are shown as mechanical devices; however, it should be appreciated that they could also be chemical adhesives or any other materials that would be suitable for attaching the cover 20 to the deck 100.

As shown, the first end 24 of the step cover 20 wraps toward the inner edge 29 of the step cover 20 such that it encloses or finishes off the end 106 of the deck 100. Once the step cover 20 is installed, it hides the first end 106 of the deck 100 from view. The second end 22 extends past the portion in which cutouts 26 are formed to form a flange 25 that is orientated in a plane parallel to the plane defined by the portion of the step cover 20 that includes cutouts 26. The flange 25 at the second end 22 can abut, or rest on, the top surface 102 of the deck 100. It should be appreciated that in some embodiments the first end portion 24 can be open and therefore not enclose the first end 106 of the deck 100. In addition, in some embodiments the second end 22 of the step cover 20 can be coplanar with the portion of the step cover 20 that includes cutouts 26 rather than coplanar with the surface 102 of the deck 100.

Still referring to FIG. 2, the step cover 20 includes a front edge portion 28 that is constructed to extend over the front side 107 of the deck 100. When installed, the front edge portion 28 of the step cover 20 hides a portion of the step portion 103 of the deck 100 from view. However, it should be appreciated that in some embodiments, the step cover 20 does not include an edge portion 28 and the edge of the deck 100 in the step portion 103 is exposed even after the step cover 20 is installed. In addition, it should be appreciated that the surfaces of the step cover 20 can be painted, coated, or otherwise finished as desired. In the embodiment shown, the edge portion 28 is fastened to the deck by fasteners 115. The cover 20 is fastened to the deck at a location in which there is no matt 40, 50 below. This feature of the cover 20 makes it possible to fix the mat 40 to be fixed to the deck 100 without beaching the integrity of the mat 40. In other words, attaching the mat 40 to the deck 100 does not necessarily require screwing or bolting thought the mat 40. However, it should also be appreciated that the cover 20 alternatively could nonetheless be fastened to the deck 100 through the mats 40 and 50.

In the embodiment shown, the cover 20 is constructed of a plastic material. However, it should be understood that the materials used to construct the cover 20 can vary. For example, in some embodiments, the same material used to construct the deck 100 can be used to construct the cover to provide a more uniform appearance.

Figure 3:
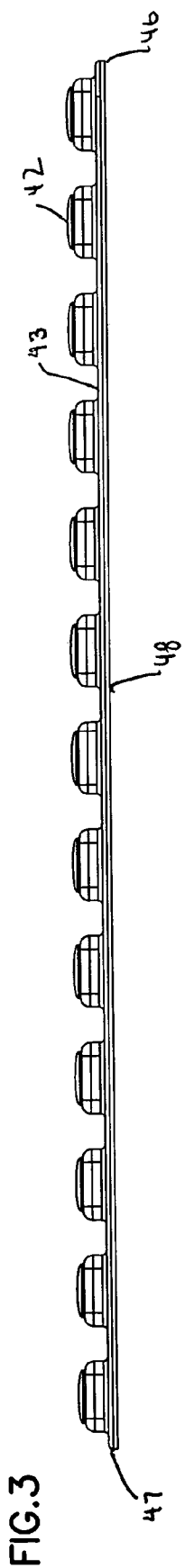
FIG. 3 is side elevation view of the mat of FIG. 1.

Referring to FIGS. 2-3, a mat 40 is shown. The mat 40 is identical to the mat 50, therefore only the mat 40 is described in detail below. The mat 40 includes a first end 47, a second end 46, a front edge 48, a back edge 49, and a top major surface 43 having raised portions 42 positioned thereon. The mat 40 is sized to fit on the deck 100 of the running board 10 under the step cover 20. The raised portions 42 of the mat 40 are shaped to extend through and interlock with the step cover 20 such that once the step cover 20 is attached to the deck 100, the mat 40 is also secured to the deck 100. In particular, the thirteen raised portions 42 are elongated in shape and are arranged perpendicular to the longitudinal axis of the mat 40. In the embodiment shown in FIGS. 2 and 3 the mat 40 has a flat bottom surface.

In some embodiments the mats 40 is constructed of plastic or rubber material (natural or synthetic). In the particular embodiments shown in the Figures, the mat 40 is constructed from a urethane material having similar properties to the material used to construct the sole so athletic shoes. Soft resilient material that otherwise may not be strong enough to be used to construct a mat for attachment to conventional running board can be used to construct the mat 40 since, in some embodiments, the cover 20 at least partially protects and secures the mat 40 in place. However, it should be appreciated that the mat 40 can be constructed of many different types materials including non-resilient materials.

It should also be appreciated that the raised portions 42 of the mat 40 need not, as described above, interlock with the step cover 20 such that the step cover 20 once attached secures the mat 40 in position on the deck 100. The mat 40 can be independently secured to the deck 100 via mechanical fasteners, adhesives, tapes, and other means. In fact, in some embodiments the mat 40 need not include any raised portions 42. Alternatively, in some embodiments the cover portion 20, once attached to the deck 100, compresses or sandwiches portions of the mat 40 and thereby aids in securing the mat 40 in position on the deck 100.

Figure 4:
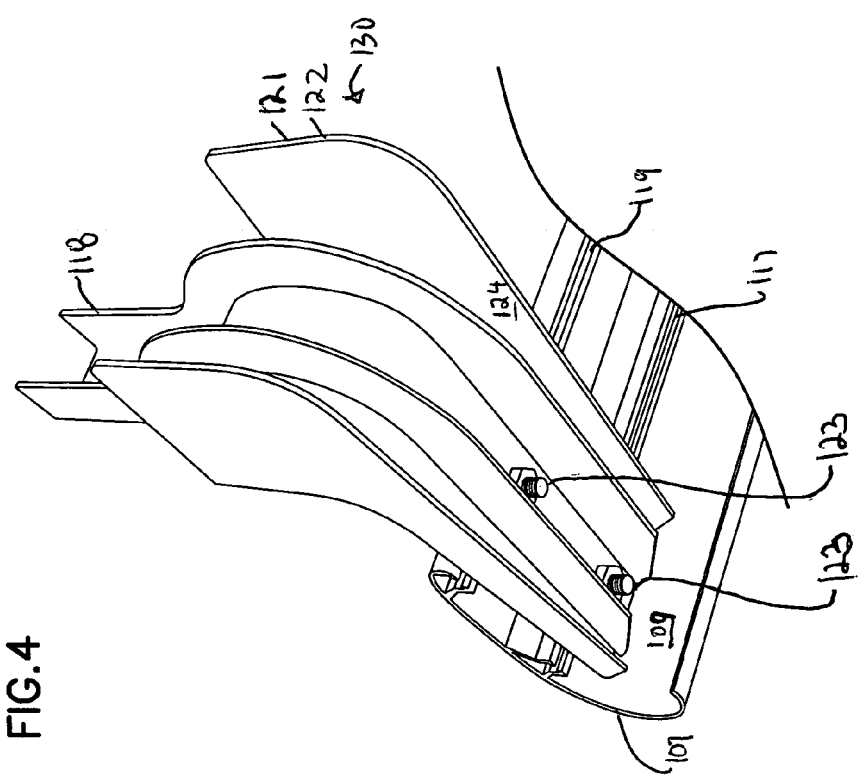
FIG. 4 is a bottom perspective view of the running board of FIG. 1 showing the brackets attached to the running board with parts removed for clarity.

Now referring to FIG. 4, the running board 10 includes a bracket assembly 130. The bracket assembly 130 includes a plurality of brackets 110 each having a first end 116 and a second end 118. Both ends 116, 118 include holes, or slots, for receiving fasteners 114. The first ends 116 are attached to the deck 100 and the second ends 118 are attached to the vehicle 12. The brackets 110 can be constructed to attach to the rocker panel and/or frame of the vehicle 12. Since the rocker panel and frame structure vary according to make and model, the exact geometry of the brackets 110 vary accordingly. It should be appreciated that the brackets 110 can be constructed of steel or any other suitable material.

Still referring to FIG. 4, the fasteners 114 are received in channels 117 and 119 that run along the underside of the deck 100. The channels 117 and 119 of the deck 100 enable the deck 100 to be attached to brackets 110 located at a number of different locations along the deck 100. The channels 117 and 119 of the deck 100 can run along the entire length of the deck 100 or only exist in regions of the deck 100 that are most likely to be attached to the brackets 110.

Referring to FIG. 4, bracket covers 121 are shown attached between the deck 100 and the brackets 110 such that they hide the brackets 110 from clear view once the running board 10 is attached to the vehicle 12. Each bracket cover 121 includes a first end 124 adapted to cover the first end 116 of the bracket 130 and a second end 122 adapted to cover the second end 118 of the bracket 130. In the embodiment shown, four brackets 110 attach the running board 10 to the vehicle 12. It should be appreciated that there are many alternative ways to connect the deck 100 to the vehicle 12. For example, the deck 100 could include arms that are integral with the deck 100 that extend outwardly and upwardly to attach to the vehicle 12.

Figure 5:
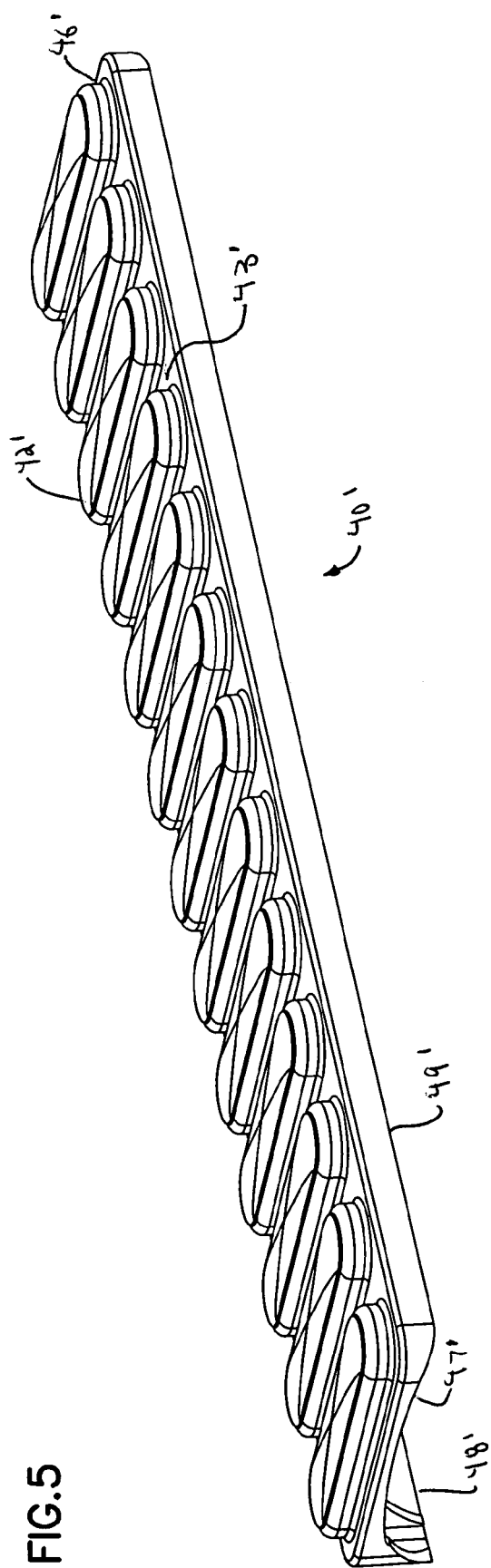
FIG. 5 is a perspective view of an alternative embodiment of the mat of FIG. 1.

An alternative embodiment of the mat 40 is shown in FIG. 5. The mat 40' shown includes a cross-sectional profile that is shaped to match the cross-sectional profile of the deck 100 to provide a snug fit between the mat 40' and the deck 100. In particular, the mat 40' includes a front edge 48,' a rear edge 49,' a first end 47,' a second end 46,' and a top major surface 43' having raised portions 42' thereon. The front edge 48' and the rear edge 49' extend away from the top major surface 43' in a downward direction tracking a portion of the curved surface of the deck 100.

The above specification, examples, and data provide a complete description of the installation and composition of the invention. Since many embodiments of the invention can be made without departing from the spirit and scope of the invention, the invention resides in the claims hereinafter appended.

We claim:

1. A running board comprising:
   a deck including a step portion and a support structure attached to the step portion and constructed to support the step portion under a door of a motor vehicle, wherein the deck includes a first terminal end and a second terminal end;
   a mat constructed to rest on the step portion; and
   a step cover constructed to cover a portion of the mat and attach to the deck and wrap at least one of the first terminal end or second terminal end of the deck to provide a finished appearance.

2. The running board according to claim 1, wherein the step cover includes a flange that extends beyond a periphery edge of the mat and is constructed to be positioned adjacent the deck.

3. The running board according to claim 2, wherein the flange is attached to the deck.

4. The running board according to claim 1, wherein the step cover includes a cutout that exposes a portion of the mat.

5. The running board according to claim 4, wherein the mat includes a raised portion that extends through the cutout.

6. The running board according to claim 5, wherein the raised portion extends past a plane defined by a top surface of the step cover.

7. The running board according to claim 1, wherein the step cover includes a plurality of cutouts that expose portions of the mat.

8. The running board according to claim 7, wherein the mat includes a plurality of raised portions that extend through the plurality of cutouts.

9. The running board according to claim 8, wherein the raised portions extend past a plane defined by a top surface of the step cover.

10. The running board according to claim 7, wherein the cutouts include an elongated shape.

11. The running board according to claim 1, wherein the mat and the step cover are sized and configured such that the mat and the step cover interlock to restrain relative movement between the stepping surface and the step cover in the plane parallel to the step portion.

12. The running board according to claim 1, wherein the deck includes an underside opposite a top side and wherein the step cover partially encloses the underside of the deck.

13. The running board according to claim 1, wherein the deck includes a second step cover that extends beyond the second terminal end to provide a finished appearance.

14. The running board according to claim 1, wherein the mat comprises a resilient construction.

15. The running board according to claim 14, wherein the step cover is fastened to the deck such tat the mat is compressed between the step cover and the deck.

16. The naming board according to claim 14, wherein the mat comprises a plastic construction.

17. The running board according to claim 1, wherein the deck comprises a polymer composition.

18. The running board according to claim 1, wherein the deck comprises a metal construction.

19. The running board according to claim 1, wherein the step cover comprises a polymer composition.

20. The running board according to claim 1, wherein the deck includes two channels that extend along a length of the deck configured to receive fasteners.

21. The running board according to claim 20, wherein the channels extend along an entire length of the deck.

22. A motor vehicle having a running board attached along a side of the motor vehicle below at least one of the motor vehicle side doom, the running board comprising:
   a deck having a stepping surface and a support structure attached to and supporting the stepping surface, wherein the deck includes a first terminal end and a second terminal end;
   a mat including a portion adjacent the stepping surface of the nmning board deck; and
   a step cover positioned over the mat securing the mat to the running board deck and wrap at least one of the first terminal end or second terminal end of the deck to provide a finished appearance.

23. A motor vehicle according to claim 22, wherein the mat is resilient material.

24. A motor vehicle according to claim 22, wherein the step cover includes a portion that is not positioned over the mat and rests on the running board deck.

25. A running board comprising:
   a deck including a step portion and a support structure attached to the step portion and constructed to support the step portion under a door of a motor vehicle, wherein the deck includes a first terminal end and a second terminal end;
   a mat constructed to rest on the step portion; and
   a step cover constructed to cover a portion of the mat and attach to the deck, wherein the step cover includes a flange that extends beyond a periphery edge of the mat and is constructed to be positioned on the step portion of the deck and wrap at least one of the first terminal end or second terminal end of the deck to provide a finished appearance.

* * * * *

UNITED STATES PATENT AND TRADEMARK OFFICE
CERTIFICATE OF CORRECTION

| | |
|---|---|
| PATENT NO. | : 7,287,770 B2 |
| APPLICATION NO. | : 10/866516 |
| DATED | : October 30, 2007 |
| INVENTOR(S) | : Drabant et al. |

It is certified that error appears in the above-identified patent and that said Letters Patent is hereby corrected as shown below:

Col. 6, line 12, claim 15: "such tat the" should read --such that the--

Col. 6, line 29, claim 22: "side doom, the" should read --side doors, the--

Col. 6, line 35, claim 22: "the nmning board" should read --the running board--

Signed and Sealed this

Twelfth Day of August, 2008

JON W. DUDAS
*Director of the United States Patent and Trademark Office*